Nov. 11, 1952  J. F. MILLER  2,617,311
COMBINATION THROTTLE AND SHIFT CONTROL
Filed April 3, 1950  4 Sheets-Sheet 1

JOSEPH F. MILLER,
INVENTOR.

BY Hazard & Miller
ATTORNEYS

Nov. 11, 1952   J. F. MILLER   2,617,311
COMBINATION THROTTLE AND SHIFT CONTROL
Filed April 3, 1950   4 Sheets-Sheet 2

JOSEPH F. MILLER,
INVENTOR.

BY Hazard & Miller
ATTORNEYS

Nov. 11, 1952 — J. F. MILLER — 2,617,311
COMBINATION THROTTLE AND SHIFT CONTROL
Filed April 3, 1950 — 4 Sheets-Sheet 3
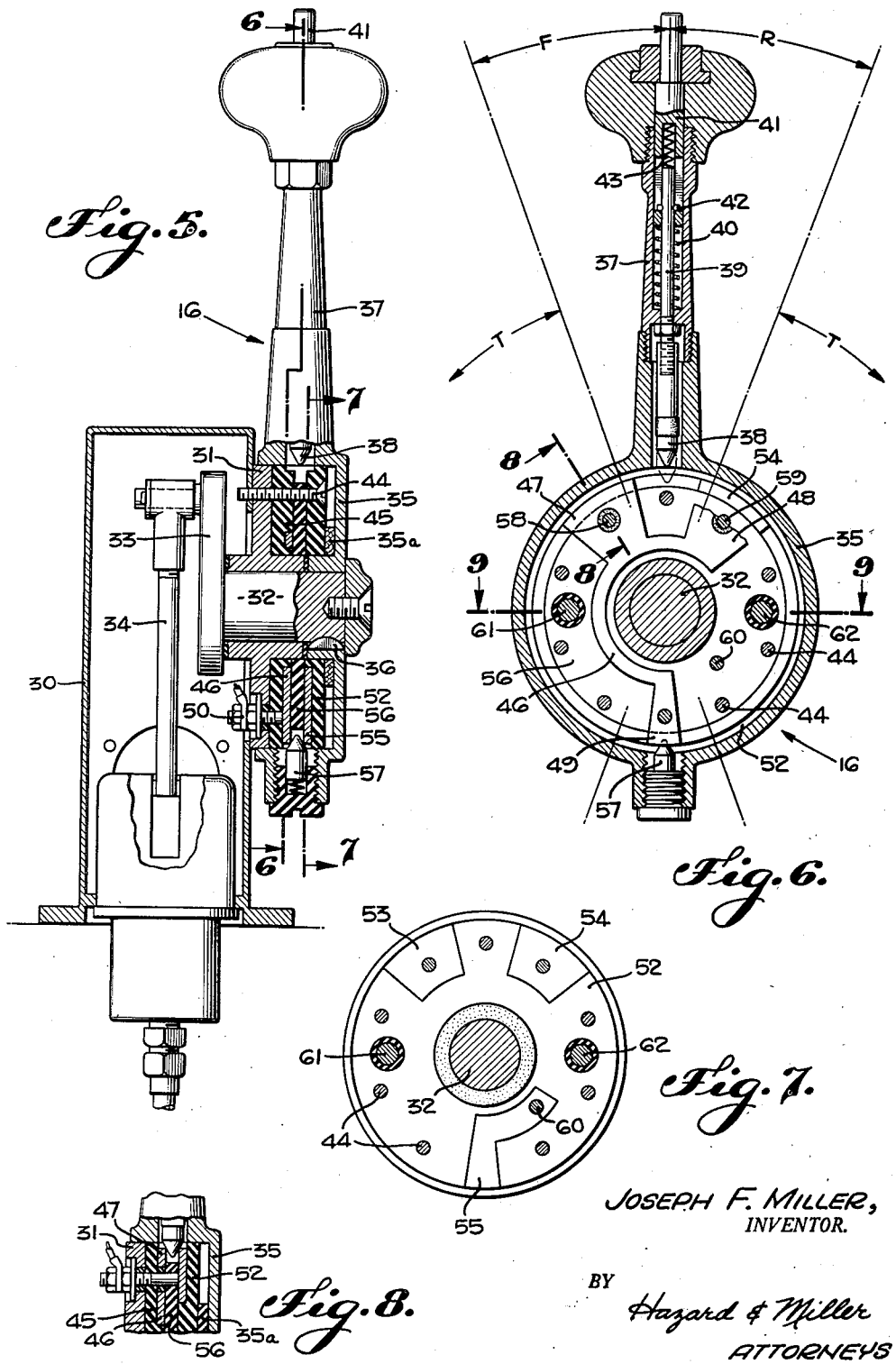
Joseph F. Miller, INVENTOR.
BY Hazard & Miller, ATTORNEYS Nov. 11, 1952   J. F. MILLER   2,617,311
COMBINATION THROTTLE AND SHIFT CONTROL
Filed April 3, 1950   4 Sheets-Sheet 4
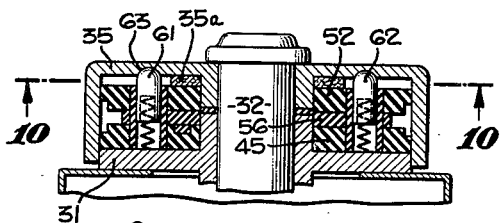
Fig. 9.
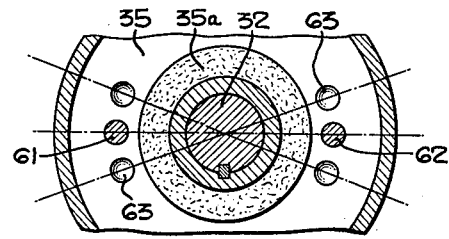
Fig. 10.
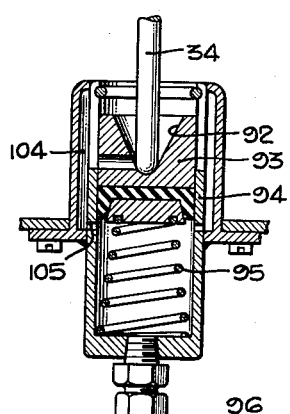
Fig. 11.
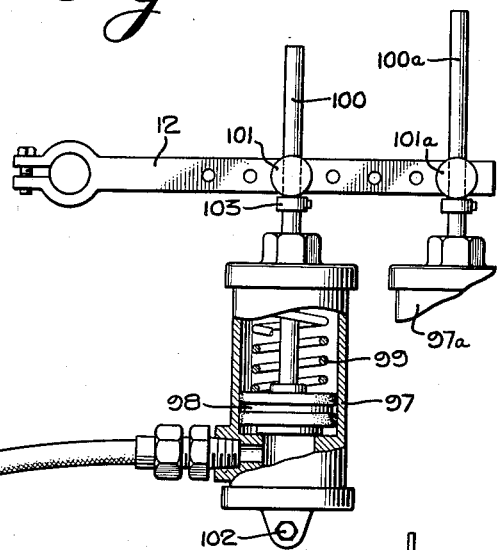
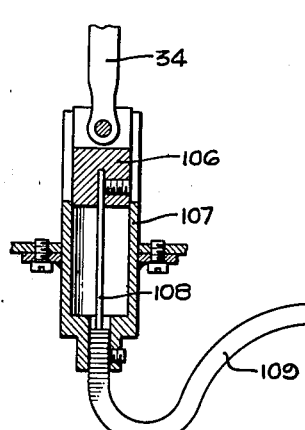
Fig. 12.
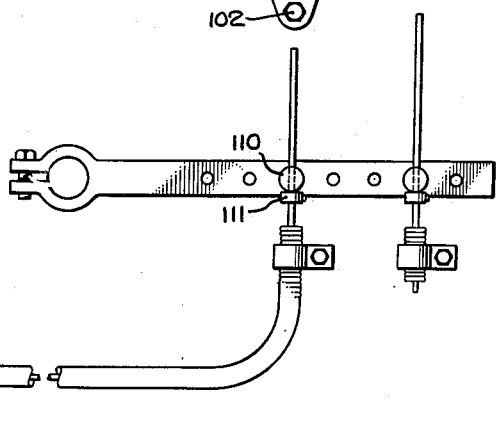
JOSEPH F. MILLER
INVENTOR.
BY
Hazard & Miller
ATTORNEYS Patented Nov. 11, 1952

2,617,311

UNITED STATES PATENT OFFICE 2,617,311

COMBINATION THROTTLE AND SHIFT CONTROL

Joseph F. Miller, Alhambra, Calif., assignor of one-fourth to Karl F. Weikel, Long Beach, Calif.

Application April 3, 1950, Serial No. 153,694

9 Claims. (Cl. 74—472)

This invention relates to a combination throttle and shift control suitable for use in conjunction with marine engines having forward and reverse transmissions operable by transmission levers.

In some types of marine engine installations the constructions are so heavy that power is required to effect a throwing of the transmission lever into forward or reverse positions or to return the transmission lever into a neutral position. In other installations the control lever which causes a shifting of the transmission lever is remotely located from the transmission and functions not only as a means for controlling the shifting of the transmission lever but also as a throttle control governing the speed of the engine. Different makes of marine engines having forward and reverse transmissions have transmission levers that have different throws and considerable differences in the resistance to their movement in shifting from neutral to a forward position or from neutral to a reverse position or from either extreme position to neutral. The amount of throw of the transmission lever from one position to another may vary in length and the positions assumed by the lever may also vary. Where a power means is used to effect a throwing of the transmission lever from one position to another some convenient means of adjustment is necessary in order for the power means to be capable of being coupled to the transmission lever of various makes of engines and function properly.

A primary object of the present invention is to provide an improved combination throttle and shift control for marine engines of this character wherein a convenient means of adjustment is properly located so that the power means utilized to effect a shifting of the transmission lever can be coupled to any transmission lever regardless of its length of throw or the positions assumed thereby and by means of the adjustment be caused to function properly.

Another object of the invention is to provide a novel and relatively simple construction whereby a single control lever may be used to optionally cause a shifting of the transmission into forward, reverse or neutral position and which control lever can also function to throttle the engine when the transmission is in either forward or reverse position. The construction embodying the present invention is so designed that by operation of the control lever the engine controlled thereby can be speeded up without involving a shifting of the transmission as in the situation where it is desired to merely warm up the engine rapidly without placing it in either forward or reverse gear or, on the other hand, the control lever can be used to effect a shifting of the transmission lever into either forward or reverse and after having accomplished the shifting at a low or idling speed the control lever may then be used to control the speed of the engine while the boat is under way. A further feature of the design is that a return of the control lever to its neutral position will automatically cut down the speed of the engine to its idling speed and also automatically return the transmission lever to its neutral position so that it is in effect impossible to shift from forward position of the transmission to reverse, or vice versa, without automatically reducing the engine speed to idling speed. In this manner a protection for the propeller, its shaft and thrust bearing is afforded.

Still another object of the invention is to provide a construction wherein relatively simple connections between the control lever and the engine and the control lever of the transmission are possible, avoiding the use of a large number of rods, brackets, clevises and the like as in the conventional arrangement and which will also enable a control lever for an engine and its transmission to be installed at more than one location such as, for example, on the flying bridge as well as in the regular cabin.

Another object of the invention is to provide a construction which readily lends itself for use on boats equipped with twin engines and twin screws or propellers that will enable each engine and its transmission to be controlled in its operation by a single control lever. The control levers for the twin engines can be located close together for convenience so that both levers can be readily operated by one hand of the pilot while the other hand is being used by the pilot to manipulate the steering wheel.

With the foregoing and other objects in view, which will be made manifest in the following detailed description and specifically pointed out in the appended claims, reference is had to the accompanying drawings for an illustrative embodiment of the invention, wherein;

Fig. 5 is a sectional view taken substantially upon the line 5—5 upon Fig. 1;

Fig. 6 is a sectional view taken substantially upon the line 6—6 upon Fig. 5;

Fig. 7 is a sectional view taken substantially upon the line 7—7 upon Fig. 5;

Fig. 8 is a partial view in section taken substantially upon the line 8—8 upon Fig. 6;

Fig. 9 is a horizontal section taken upon the line 9—9 upon Fig. 6;

Fig. 10 is a view taken upon the line 10—10 upon Fig. 9 in the direction indicated;

Fig. 11 is a sectional view illustrating one form of connection that may be employed between a control lever and the throttle valve of the engine; and Fig. 12 is a similar view but illustrating an alternative form of construction that may be employed to connect the control lever with the throttle valve of the engine.

Figure 2:
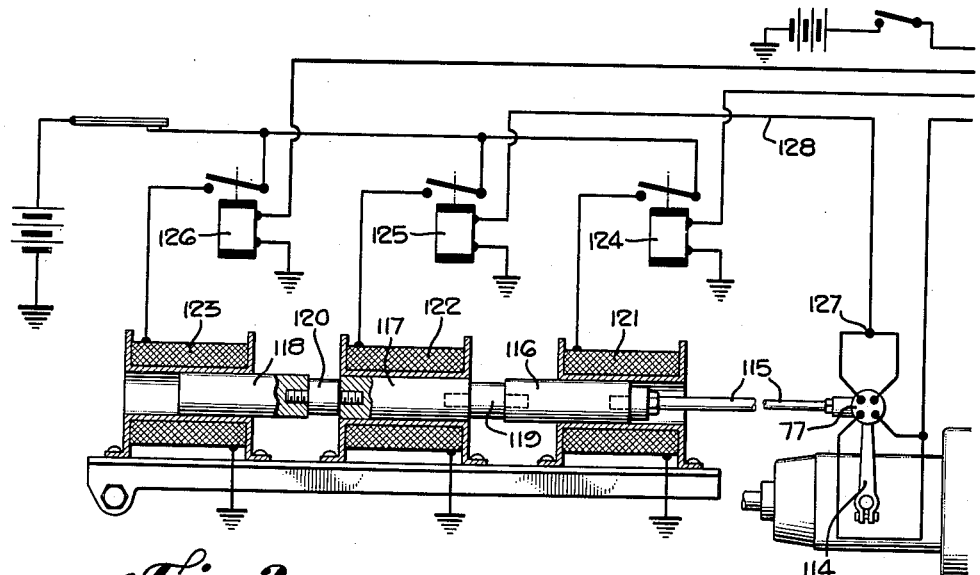
Fig. 2 is a diagrammatic view of an alternative form of construction embodying the present invention.

Referring to the accompanying drawings wherein similar reference characters designate similar parts throughout, 10 indicates a marine engine having an intake manifold 11 to which fuel is supplied from a carburetor, the throttle valve of which is controlled by an arm or crank 12. Such a marine engine is usually equipped with a transmission 13 controlled by a transmission lever 14. In some forms of construction this transmission lever is located on the side of the transmission housing and is swung forwardly to connect the crank shaft of the engine with the drive or propeller shaft 15 so as to drive the propeller shaft in a forward direction. If the lever 14 is swung rearwardly the transmission connects the crank shaft of the engine with the propeller shaft 15 in such a manner as to drive the propeller shaft in a reverse direction. In other types of transmissions used on marine engines the transmission lever, instead of being located on the side of the transmission housing, is located on the top thereof as shown in Fig. 2, and swings in a horizontal plane rather than in a vertical plane. As above explained, in different types of marine transmissions the length of throw of the lever 14 from a neutral position into a forward position may vary and likewise the length of throw from a neutral position into a reverse position may vary. The positions assumed by the lever 14 in any of the three operative conditions may likewise vary. It is desirable to be able to shift the lever 14 to or from either of the three positions by a remotely located control lever generally indicated at 16 that may be located on the bridge of the vessel or convenient to the pilot's seat. Such a control lever on being moved forwardly can be used to first shift the transmission lever 14 forwardly and then may function to control the speed of the engine by shifting the position of the throttle lever or crank 12. Conversely, if it is desired to reversely operate the vessel on shifting the lever 16 rearwardly the transmission lever 14 can be shifted into reverse position and the speed of the engine controlled by the lever 16 while the transmission is in reverse.

Figure 1:
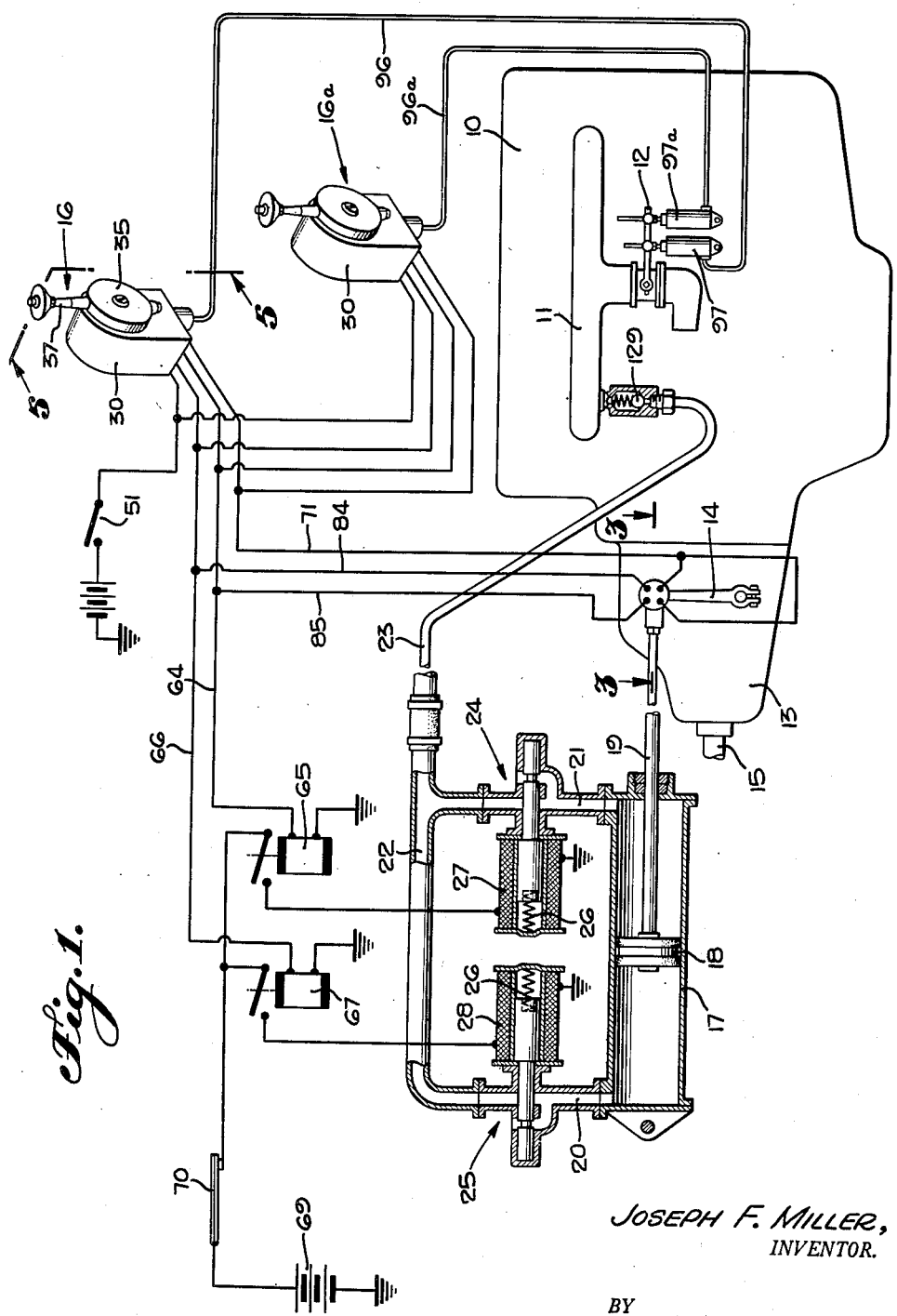
Figure 1 is a diagrammatic view illustrating one form of construction embodying the present invention.

In that form of construction shown in Fig. 1, one form of power means is shown to effect a throwing of the transmission lever 14. This is shown as consisting of a differential pressure motor having a cylinder 17 within which there is a piston 18, the piston rod 19 being pivotally connected to the transmission lever 14 as will be hereinafter explained. The ends of the cylinder 17 communicate through passages 20 and 21 with a manifold 22 that is connected by means of a conduit 23 to the intake manifold 11 so as to utilize the vacuum or negative pressure in the manifold 11 as a source of power for operating the piston 18. The passages 20 and 21 are controlled by solenoid valves, generally indicated at 24 and 25. These valves are normally urged by springs 26 into positions wherein the passages 20 and 21 are closed to the manifold 22 but are open to atmosphere. However, when either solenoid 27 or 28 is energized its valve will be shifted to close the outlet to atmosphere and open its passage to the manifold 22 so that vacuum or negative pressure will be conducted to one end of the cylinder 17 or the other. Thus if solenoid 27 is energized, vacuum or negative pressure from the intake manifold 11 will be conducted to the right hand end of cylinder 17 and the atmospheric pressure in the left hand end of the cylinder is effective on the piston 18 to shift the transmission lever 14 forwardly. Conversely, if the solenoid 28 is energized the differential in pressure effective on the piston 18 serves to move the piston toward the left and thus swing the transmission lever 14 into reverse position. When either solenoid 27 or 28 is de-energized its spring 26 is effective to return the valve to the position shown wherein both ends of the cylinder 17 are open to atmosphere and are disconnected from the manifold 22.

The details of the control lever 16 are illustrated in Figs. 5 to 10, inclusive. This consists of a suitable pedestal or housing 30 to one side of which there is secured a bushing 31. The bushing serves to rotatably support a shaft 32 carrying a crank 33 to which a pitman 34 may be connected. The outer end of the shaft 32 has a cap 35 mounted thereon and keyed thereto such as by a key 36. This cap carries a tubular arm or handle indicated at 37 within which there is disposed a brush or contactor 38. The brush or contactor carries a stem 39 that is surrounded by a compression spring 40 that is effective to urge a button 41 upwardly through the handle. This button has its lower end engageable with a pin 42 in the stem so as to normally lift the brush or contactor into the full line position shown in Fig. 6. A compression spring 43 is disposed between the interior of the bottom and the top of the stem 39 so that on depressing the button 41 the contactor or brush 38 may be moved downwardly or toward the center of the shaft 32 regardless of the pressure of the compression spring 40. The contactor will be pressed against contacts, hereinafter described, by the pressure of the compression spring 43.

Between the cap 35 and the flange of the bushing 31 there are insulating discs secured to the flange of the bushing and to the housing 30 such as by screws 44. On the outer face of the disc 45 there is a metallic member 46 which provides three contacts 47, 48 and 49 arranged adjacent the periphery of the disc, all of which are electrically connected together. This metallic member is equipped with a binding post 50 that is connected through a switch 51 (see Fig. 1) to a source of electric current such as, for example, the ignition primary circuit for the engine 10. The switch 51 may be so arranged that on turning on or completing the ignition primary circuit for the engine, switch 51 will automatically be closed to conduct electric current to the three contacts 47, 48 and 49. On the outer insulating disc 52 within the cap 35 there are three contacts arranged adjacent the periphery of that disc. These contacts are electrically insulated from each other and are disposed opposite the contacts 46, 47 and 49, respectively, across an intervening insulating disc 56. The edges of the contacts 47, 53, 48 and 54 are such that they may be engaged by the brush or contactor 38 when that brush or contactor is depressed by the button 41 and the cap 35 is rotated with the shaft 32. Thus if the handle 37 is swung in a counterclockwise direction from the position shown in Fig. 6, the brush or contactor 38 will establish an electrical connection between contacts 48 and 54. Contacts 49 and 55 are normally in electrical contacts with each other through a spring-actuated brush 57 when the handle is in neutral position but when the handle is rotated from the neutral position, shown in Fig. 6, the brush 57 will be carried to a position disengaging contacts 49 and 55.

Each of the contacts 53 and 54 has a binding post connected thereto, such binding posts being indicated at 58 and 59, the details of which are illustrated in Fig. 8. In a similar manner the contact 55 is equipped with a binding post 60. Spring-actuated detents 61 and 62 extend through the discs and are partially receivable in depressions or sockets 63 that may be formed on the interior of the cap 35 to hold the cap and its handle in a position to which it may have been moved or shifted until forcibly displaced therefrom. A fiber friction disc 35a is disposed between the cap 35 and the insulating discs to hold the cap frictionally in any position to which it may be set against creep due to vibration.

Binding post 58 is connected by a conductor 64 to a relay 65 that controls the circuit through the solenoid 27. In a similar manner binding post 59 is connected by a conductor 66 to a relay 67 that controls the circuit through the solenoid 28. These relays are in circuit with a relatively heavy source of battery current supplied by the battery 69 and, in the preferred form of construction, this circuit includes a thermostatic cutout 70 designed to automatically open the circuit through the relays after a predetermined length of time so that the heavy current supplied by the battery cannot continue to flow through the solenoids 27 or 28 continuously for longer than the predetermined length of time. The thermostatic cutout is merely a protective measure for preventing the loading of the solenoids 27 or 28 excessively. It will thus be appreciated that, if the handle 37 is pushed forwardly and the button 41 is depressed, the circuit through the relay 65 will be closed to energize the solenoid 27 and thus cause the differential pressure motor to shift the transmission lever 14 forwardly. Conversely, if the handle 37 is swung rearwardly while the button 41 is depressed, the circuit through the relay 67 will be closed, the solenoid 28 will be energized, and the differential pressure motor will swing the transmission lever 14 rearwardly to reversely rotate the propeller shaft 15.

Figure 3:
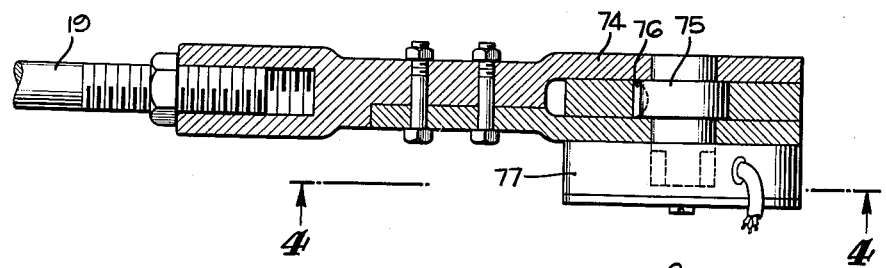
Fig. 3 is a sectional view taken substantially upon the line 3—3 upon Fig. 1.
Figure 4:
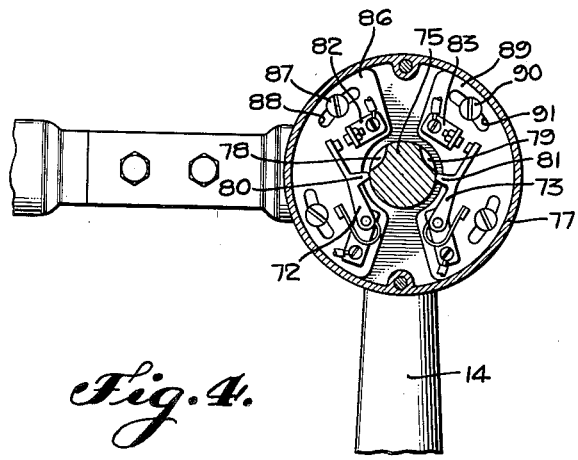
Fig. 4 is a sectional view taken substantially upon the line 4—4 upon Fig. 3.

The binding post 60 which is on the contact 55 is connected by conductor 71 to contacts 72 and 73 (see Fig. 4) that are associated with the pivotal connection between the piston rod 19 and the transmission lever 14. As illustrated in Fig. 3, the end of the piston rod 19 is in the form of a clevis 74 which provides journals for a pivot pin 75 that is keyed such as by a key 76 to the lever 14. The clevis also carries a housing 77 that surrounds the end of the pivot pin 75 that is shaped to provide a cam having two depressions therein indicated at 78 and 79. The contacts 72 and 73 carry cam followers 80 and 81 and are spring-urged against the periphery of the cam. These contacts are arranged opposite contacts 82 and 83, respectively, and in the neutral position of the transmission lever 14 the contacts 72 and 73 are held out of engagement with the contacts 82 and 83 as shown in Fig. 4. However, if the transmission lever 14 is swung forwardly the pivot pin 75, in turning with the lever, will eventually position the depression 79 opposite the cam follower 81 allowing the contacts 73 to engage the contact 83. Conversely, if the lever 14 is swung rearwardly, depression 78 will assume a position opposite the cam follower 80 allowing contact 72 to engage contact 82. When the lever 14 returns from either of its extreme positions to neutral the pivot pin and cam return to the position shown in Fig. 4 wherein all contacts within the housing 77 are disengaged. Contact 83 is connected by a conductor 84 to conductor 66 which leads to relay 67 and contact 82 is connected by a conductor 85 to conductor 75 which leads to relay 65. If it should be assumed that the control lever 16 has been swung forwardly while the button 41 is depressed to cause the transmission lever 14 to be shifted into its forward position, this movement of the transmission lever serves to close contacts 73 and 83 preparing a circuit through relay 67 but not closing the circuit due to the fact that when the lever 16 is in its forward position there is no electrical connection through brush 57 across contacts 49 and 55. However, when the control lever 16 is returned to its neutral position, as shown in Fig. 6, brush 57 establishes electrical connection between contact 49 and contact 55 thus closing the circuit through contacts 73 and 83, actuating the relay 67 and operating the solenoid valve 25. This is effective to supply vacuum or negative pressure to the left hand end of cylinder 17 causing the piston 18 to move from the right hand end of the cylinder toward the left. This movement continues until the lever 14 reaches its neutral position wherein the cam on the pivot pin 75 is in the position shown in Fig. 4. In this position the circuit through relay 67 is broken by the opening of contacts 73 and 83. Consequently when the control lever 16 returns to neutral the lever 14 will be returned to neutral and as soon as it reaches neutral position the circuit through relay 67 is open and the solenoid 28 is de-energized, stopping movement of the piston 18 in its neutral position. In a similar manner, if the control lever 16 is assumed as having been swung into the reverse position, lever 14 will have been reversely swung causing the depression 78 to allow contacts 72 and 82 to engage and prepare the circuit through relay 65. On returning the control lever 16 to neutral, brush 57 completes the circuit thus prepared, returning the transmission lever 14 to neutral where it automatically stops by reason of the disengagement of the contacts 72 and 82.

A feature of the construction resides in the fact that the contacts 72 and 82 are both mounted on a section of insulating material, indicated at 86, that is circumferentially adjustable within the housing 77 by means of screws 87 extending through slots 88. In a similar manner, contacts 73 and 83 are mounted on a section of insulating material 89 that is likewise circumferentially adjustable by means of screws 90 extending through slots 91. In this manner both sets of contacts associated with the pivotal connection between the piston rod 19 and the transmission lever 14 can be adjusted around the periphery of the cam. This adjustment of one set of contacts independently of the other is frequently quite important in that the exact positions when or where the contacts 72—82 and 73—83 open and close can be varied to meet the requirements of the throw or positions assumed by the lever 14 in each of its three operating positions, namely, forward, reverse and neutral.

In the event that the adjustment of the sections of insulation on which the contacts are mounted is insufficient, the pivot pin 75 with its associated cam can be readily substituted or replaced to provide a cam with depressions 78 and 79 properly located. The ease with which such a substitution can be made is a further feature or advantage of having the circuit preparing contacts associated with the pivotal connection between the piston rod 19 and the transmission lever 14.

The construction above described lends itself to the use of more than one control lever which levers may be located at different places on the boat and control the same engine and its transmission. For example, the control lever 16 may be located on the flying bridge near the steering wheel thereon and a similar or identical control lever, indicated at 16a, may be located elsewhere such as, for example, in the regular cabin. This control lever may have its contacts or brushes electrically connected in parallel with the contacts or brushes of the control lever 16 so that either control lever may be used to close the electric circuits required to shift the lever 14 to its three positions.

Each control lever 16 and 16a is also capable of controlling the throttle valve of the engine 10. Thus as illustrated in Fig. 5, the crank 33 is in its uppermost position when the control lever handle 37 is in its upright or neutral position. This crank has its pitman 34 engageable with a socket 92 in a piston 93 that is vertically reciprocable in a cylinder 94. This piston is urged by a compression spring 95 into its uppermost position but when the control lever is swung either forwardly or rearwardly the pitman depresses the piston 93 against the action of the compression spring 95 and expels a liquid such as oil through a conduit 96 into a slave cylinder 97 located near the throttle valve crank or arm 12. Within the slave cylinder 97 there is a piston 98 urged downwardly by a compression spring 99 and this piston has a piston rod 100 slidably extending through the head of a pivot bolt 101. The shank of this pivot bolt is pivotally mounted in the arm 12 and the slave cylinder itself is preferably pivoted as at 102. A collar 103 is adjustably mounted on the piston rod 100 and when the piston 98 is elevated this collar serves to force the throttle valve crank 12 upwardly. In the event that two control levers are employed indicated at 16 and 16a, the control lever 16a has a similar pitman operable upon a piston similar to the piston 93 and serving to expel liquid through a conduit 96a to a slave cylinder 97a wherein there is a piston having a piston rod that is also connected to the arm or crank 12 in the same manner. Consequently when the control lever 16a is operated the throttle valve of the engine may be opened by the control lever 16a independently of the position of the other control lever. Whenever the throttle valve arm or crank 12 is elevated by the operation of the control lever 16 the pivot bolt 101a merely slides upwardly on the piston rod 100a and conversely whenever the crank 12 is elevated by the control lever 16a the pivot bolt 101 merely slides upwardly on the piston rod 100.

Surrounding the cylinder 94 there may be a jacket or reservoir 104 connected by small ports 105 to the cylinder 94 below the piston 93 when the piston is in its uppermost position. These ports permit air in the conduit 96 to escape up through the jacket 104 and serve also to maintain the conduit as well as the cylinder 94 filled with oil at all times.

An alternative form of construction for connecting the control levers to the throttle valve of the engine is illustrated in Fig. 12 wherein the pitman 34 is pivotally connected to a slide 106 in a cylinder or guide 107. This slide is connected by a wire 108 that is slidable in protective tubing 109 to the pivot bolt 110, the end of the wire being slidable through the pivot bolt similar to the piston rod 100. A collar 111 is adjustable on the wire near its end and engages the pivot bolt in the same manner as the collar 103.

In the operation of the construction above described it will be appreciated that to shift the transmission lever 14 into its forward position the operator need merely depress the button 41 and swing the control lever 16 forwardly. The initial forward movement functions to close the circuit to throw the transmission lever 14 into its forward position and thereafter forward movement of the control lever 16 merely serves to control the throttle valve of the engine. It is unnecessary to keep the button 41 depressed after the initial forward movement. In a similar manner, if it is desired to operate the boat in reverse, the control lever 16 is swung rearwardly while the button 41 is depressed. The initial rearward movement closes the circuit to cause the lever 14 to be shifted into reverse position and thereafter the control lever 16 functions merely to control the throttle valve.

In Fig. 2 an alternative form of construction is disclosed wherein the transmission lever 114 is shown as being on top of the transmission housing and swingable in a horizontal plane. This lever has a rod 115 pivotally connected thereto by a pivot pin similar to the pivot pin 75. The rod 115 is in turn connected to three cores or armatures 116, 117 and 118. These cores or armatures are spaced from each other by non-magnetic spacers or connectors 119 and 120. The spacing of the cores or armatures from each other is somewhat less than the spacing of their solenoids or windings 121, 122 and 123 in which they are respectively disposed. When winding 121 is energized it will tend to centralize its core or armature 116 therein, causing the lever 114 to be swung forwardly. Conversely, if the winding 123 is energized it will tend to centralize its armature or core 118 therein, causing the lever 114 to be swung rearwardly. When the lever 114 is in either of its extreme positions and the winding 122 is energized, it will tend to centralize its core or armature and return the lever 114 to neutral position. Relays 124, 125 and 126 control the circuits through the windings 121, 122 and 123, respectively. Associated with the pivotal connection between the rod 115 and the transmission lever 114 there is a housing containing the contacts and cam similar to that illustrated in Figs. 3 and 4. However, in this form of construction the contacts 82 and 83 are connected together as indicated at 127 and the conductor leading therefrom indicated at 128 leads to the relay 125 that controls the circuit through the winding 122 that returns the lever 114 to neutral position. In all other respects the connections from the contacts within the housing 77 and the control lever and between the control lever and the relays 124 and 126 are the same as previously described. Consequently in this form of construction when the control lever has been moved forwardly to swing the transmission lever 114 forwardly the closing of the contacts 73—83 merely serves to prepare the circuit through the relay 125. When the control lever is returned to neutral the circuit through the relay 125 is closed causing armature 117 to return the transmission lever 114 to neutral. Similarly, if the control lever has been shifted to reverse, the closing of the contacts 72—82 prepares the circuit through the same relay 125 so that when the control lever is returned to neutral winding 122 will be energized and return the transmission lever to its neutral position.

In both forms of construction it will be appreciated that a power means is employed to shift the transmission lever into its forward position or into its reverse position that is controlled by the control lever which also functions as a throttle operator. The shifting of the transmission lever into its forward position or reverse position prepares the circuit which, when energized by the returning of the control lever to neutral, will enable the transmission lever to be returned to its neutral position by the power means. In the form of construction shown in Fig. 1, the power means used to return the transmission lever from forward position to neutral is accomplished by the partial operation of the reverse power means whereas in that form of construction shown in Fig. 2, the power means for returning the transmission lever to neutral is the winding 122 and its armature 117. In both forms of construction inasmuch as the contacts that prepare the circuits are associated with the pivotal connection between the transmission lever and its operating rod, adjustments can be easily made to accommodate the construction to different transmissions having transmission levers whose throws may vary and whose positions in forward, neutral or reverse may vary.

In both forms of construction, if the control lever is moved forwardly or rearwardly from its central or neutral position without depressing the button 41, the throttle valve of the engine will merely be controlled to speed up the engine without shifting the transmission from its neutral position. This is frequently desirable when it is desired to warm up the engne while the boat is still tied to a slip, float or mooring. If it is desired to propel the boat forwardly by the engine, the control lever is moved forwardly with the button 41 depressed which causes the transmission lever to be shifted while the engine is operating at idling speed. Thereafter the continued movement of the control lever forwardly merely serves to speed up the engine. The same is true when the control lever is shifted rearwardly with the button 41 depressed. When the control lever is in either the forward or reverse position and is returned to its neutral position the transmission will be automatically returned to neutral whether the button 41 is depressed or not. Furthermore the connection with the throttle valve is such that the return of the control lever to neutral automatically reduces the engine speed to idling. Consequently, if the control lever is shifted from a forward position through neutral to a reverse position with the button 41 depressed, the engine speed will be reduced to idling speed in returning to neutral so that in shifting the transmission to reverse this is performed while the engine is idling. The same sequence takes place in shifting the control lever from reverse position through neutral to a forward position.

The improved arrangement also lends itself for use on boats having twin engines and twin screws, each engine being equipped with its own transmission. In such an event a control lever and its associated structure, as shown in Fig. 5, is merely duplicated on the left hand side of the housing or pedestal 30 so that both levers are located quite close together and either or both can be operated by a single hand of the pilot, leaving the other hand free to manipulate the steering wheel. Where twin engines are employed I prefer to cross-connect the conduit or tubing 23 and to equip each tubing with a check valve such as that illustrated at 129. The purpose of such an arrangement is, briefly, as follows:

Vacuum created in the manifold of one engine can then be used to operate its own differential pressure motor or the differential pressure motor of the companion engine without the use of a vacuum tank. If one engine is operating at high speed or at wide open throttle, the vacuum in its manifold is very low and if the other engine is operating at idling speed, the vacuum in its manifold is quite high. This high vacuum may be used to operate the differential pressure motor of its companion engine if the tubings 23 are cross-connected. The check valve 129 in each tubing 23 prevents flow from the manifold having low vacuum into the tubing of the engine having the high vacuum.

From the above described construction it will be appreciated that the improved control is highly advantageous in its simplicity of construction, its ease of installation and ease of operation, requiring a minimum amount of attention from the pilot, effecting the desired speed and the desired shifting of the transmission.

Various changes may be made in the details of the construction without departing from the spirit and scope of the invention as defined by the appended claims.

I claim:

1. In combination, a marine engine having a forward and reverse transmission operable by a lever, power means for shifting the lever into a neutral position, a forward position or a reverse position, a control lever operatively connected to the engine to control the speed thereof, selector switches associated with the control lever and in circuit with the power means to cause the power means to shift the transmission lever into forward position when the control lever is shifted forwardly and to shift the transmission lever into reverse position when the control lever is shifted rearwardly, said switches including a neutral position switch adapted to be closed when the control lever is in neutral position, and circuit-preparing switches arranged at the connection between the power means and the transmission lever in circuit with the neutral switch and with the power means arranged to be closed only when the transmission lever is in its forward or reverse position and to open when the transmission lever approaches its neutral position whereby when the control lever is positioned in neutral position after having been in either forward or reverse position a circuit will be closed through the power means to return the transmission lever to neutral and upon reaching neutral the circuit through the power means will be automatically opened.

2. In combination with a marine engine having a forward and reverse transmission operable by a lever, a shifting rod pivotally connected thereto for shifting said lever, power means for operating the shifting rod to shift the transmission lever into either forward, neutral or reverse positions, means forming a forward power circuit and a reverse power circuit, selector switches therefor, and means forming a neutral power circuit and a selector switch therefor, said neutral power circuit including circuit-preparing switches located at the connection between the transmission lever and shifting rod operable by the change in relative angularity between the shifting rod and said lever to open when the transmission lever is in neutral position and to close when the transmission lever is in an extreme position.

3. In combination with a marine engine having a forward and reverse transmission operable by a lever, a shifting rod pivotally connected thereto for shifting said lever, power means for operating the shifting rod to shift the transmission lever into either forward, neutral or reverse positions, means forming a forward power circuit and a reverse power circuit, selector switches therefor, and means forming a neutral power circuit and a selector switch therefor, said neutral power circuit including circuit-preparing switches located at the connection between the transmission lever and shifting rod operable by the change in relative angularity between the shifting rod and said lever to open when the transmission lever is in neutral position and to close when the transmission lever is in an extreme position, the positions at which the circuit-preparing switches are opened and closed being circumferentially adjustable with relation to the axis of pivot between the shifting rod and the transmission lever.

4. In combination with a marine engine having a forward and reverse transmission operable by a lever, a shifting rod pivotally connected thereto for shifting said lever, power means for operating the shifting rod to shift the transmission lever into either forward, neutral or reverse positions, means forming a forward power circuit and a reverse power circuit, selector switches therefor, and means forming a neutral power circuit and a selector switch therefor, said neutral power circuit including circuit-preparing switches located at the connection between the transmission lever and shifting rod operable by the change in relative angularity between the shifting rod and said lever to open when the transmission lever is in neutral position and to close when the transmission lever is in an extreme position, the positions at which the circuit-preparing switches are opened and closed being circumferentially adjustable independently of each other with relation to the axis of pivot between the shifting rod and the transmission lever.

5. Circuit-preparing switches for use in conjunction with a power-operated shifting rod element and the transmission lever element of a marine engine having a forward and reverse transmission comprising a cam on one of said elements adapted to be rotated relative to the other in shifting the lever into either forward or reverse position, and a pair of switches mounted on the other of said elements arranged to be operable by the cam so that one switch will be closed when the transmission lever is in forward or reverse position and both will be open when the transmission lever is in neutral.

6. Circuit-preparing switches for use in conjunction with a power-operated shifting rod element and the transmission lever element of a marine engine having a forward and reverse transmission comprising a cam on one of said elements adapted to be rotated relative to the other in shifting the lever into either forward or reverse position, and a pair of switches mounted on the other of said elements arranged to be operable by the cam so that one switch will be closed when the transmission lever is in forward or reverse position and both will be open when the transmission lever is in neutral, each switch being adjustable about the periphery of the cam independently of the other so that the exact position of its opening and closing can be varied to compensate for different throws of different transmission levers.

7. In combination with a marine engine having a forward and reverse transmission, a shifting rod pivotally connected to the lever of such transmission, armatures mounted on the shifting rod, solenoids for the armatures adapted when energized to centralize the armatures to shift the transmission into either forward, reverse or neutral positions, and circuits including selector switches for selectively energizing said solenoids and including preparatory switches located at the connection between the shifting rod and the transmission lever operable by a change in angularity therebetween for preparing a circuit through the neutral solenoid when the transmission lever is in one of its extreme positions.

8. In combination with a marine engine having a transmission operable by a lever capable of beng shifted into forward, reverse or neutral position, a shifting rod pivotally connected to said lever, a differential pressure motor for operating the shifting rod, solenoid valves controlling the pressure supplied to the motor to operate it in either direction, a control lever, selector switches associated therewith, and means providing circuits between the control lever, selector switches and the solenoid valves including circuit-preparing switches located at the connection between the shifting rod and the transmission lever for preparing a circuit through the solenoid valve controlling operation of the motor in a reverse direction when the transmission lever is in its forward position and preparing a circuit through the solenoid valve controlling operation of the motor in its forward direction when the transmission lever is in its reverse position.

9. In combination with a marine engine having a forward and reverse transmission, a control lever movable forwardly or rearwardly from a neutral position, means operatively connecting the lever to the throttle of the engine to open the throttle as the lever is moved forwardly or reversely from the neutral position and allow the throttle to close to idling speed position when the control lever is returned to neutral position, power means for shifting the transmission, and circuit closing means associated with the control lever for optionally closing a circuit to cause the power means to shift the transmission into forward position when the control lever is shifted forwardly and to optionally cause the power means to shift the transmision into reverse position when the control lever is shifted rearwardly, and circuit closing means associated with the control lever to automatically cause the power means to return the transmission to neutral position whenever the control lever is returned to its neutral position.

JOSEPH F. MILLER.

REFERENCES CITED

The following references are of record in the file of this patent:

UNITED STATES PATENTS

| Number | Name | Date |
|---|---|---|
| 925,270 | Beemer | June 15, 1909 |
| 1,394,125 | Stailey et al. | Oct. 18, 1921 |
| 1,738,462 | Stevens | Dec. 3, 1929 |
| 2,156,118 | Kliesrath | Apr. 25, 1939 |
| 2,248,564 | Wood | July 8, 1941 |
| 2,323,619 | Panish | July 6, 1943 |
| 2,323,878 | Kesling | July 6, 1943 |
| 2,386,391 | Fike et al. | Oct. 9, 1945 |
| 2,422,596 | Stevens | June 17, 1947 |
| 2,433,235 | Panish | Dec. 23, 1947 |